Nov. 4, 1952   H. A. ALTORFER   2,616,255
COMPENSATED EXPANSION JOINT
Filed Aug. 26, 1948
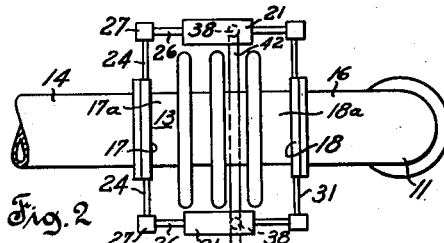
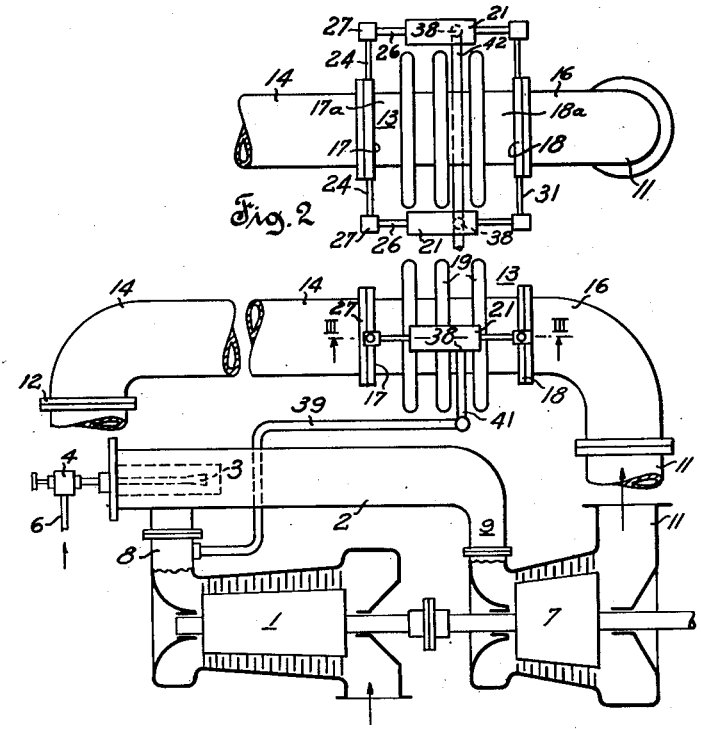
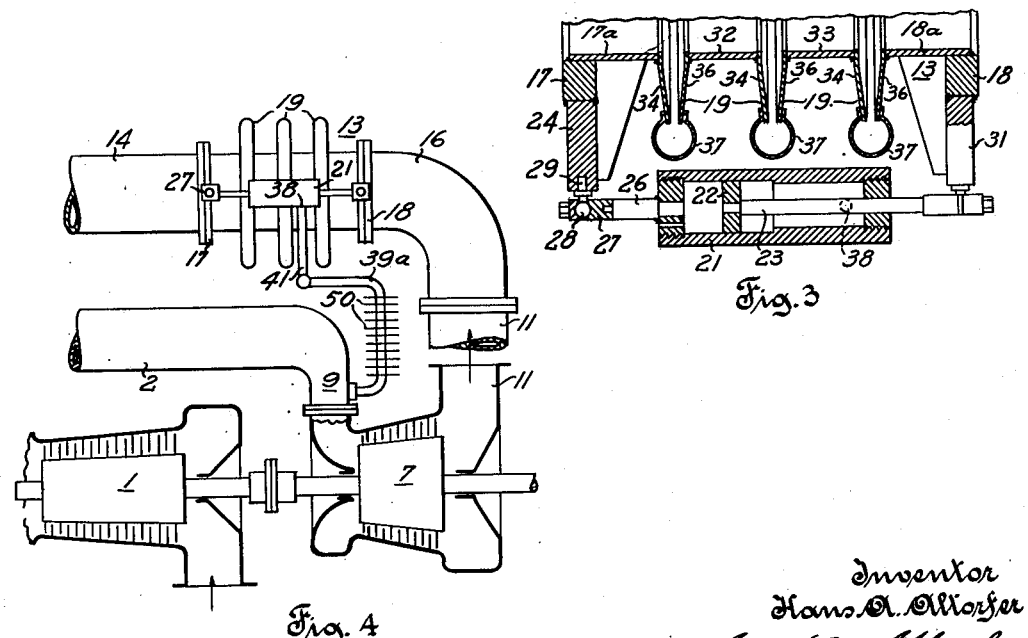

Patented Nov. 4, 1952

2,616,255

UNITED STATES PATENT OFFICE 2,616,255

COMPENSATED EXPANSION JOINT

Hans A. Altorfer, Wauwatosa, Wis., assignor to Allis-Chalmers Manufacturing Company, Milwaukee, Wis., a corporation of Delaware Application August 26, 1948, Serial No. 46,314

10 Claims. (Cl. 60—39.32)

This invention relates generally to fluid conducting systems embodying a source of high temperature elastic fluid and a fluid expanding means exhausting hot elastic fluid at a relatively low pressure, and more particularly to means for effectively minimizing stresses set up in an exhaust fluid confining portion of the system by axially acting forces produced by changes in the temperature and pressure of the hot, low pressure exhausted fluid confined therein. This application is a continuation in part of my application Serial Number 480,497, filed March 25, 1943, now abandoned.

A practical design for such a system should embody one or more fluid tight joints in the exhaust fluid conductor operable to permit a relative expansion and contraction of interconnected parts, the number and location of the joints being in each case determinable from the dimensions and arrangements of such parts. In order to render such joints effective and to keep their dimensions within practical limits, it is necessary to embody in each joint one or more annular sections having a relatively thin side wall or walls which are flexible axially without subjecting the conduit sections or other parts interconnected thereby to a detrimental degree of axial thrust. Such joint constructions, although operable to a satisfactory degree in the constant temperature and pressure type of system, have not proven effective in systems handling large quantities of fluid subjected to large variations in both temperature and pressure since the resulting variations in the temperature and pressure of the hot, low pressure exhaust fluid produces large changes in axial thrust which in many instances are sufficient (unless the joints have a relatively large number of serially arranged axially flexible portions or several joints are employed in series), to rupture or collapse the axially flexible portions thereof, thus rendering same ineffective to prevent overstressing the parts interconnected thereby.

It is, therefore, the primary object of this invention to provide a high temperature fluid conducting system of the type hereinabove specified with means to compensate for the axial thrust imparted to interconnected, exhaust fluid conducting parts by the pressure of the hot, low pressure fluid flowing therethrough.

Another object of this invention is to provide a high temperature fluid conducting system of the type hereinabove mentioned with means for minimizing the stresses set up in interconnected, exhaust fluid conducting parts by axially acting forces and/or rendering a minimum number of joints having a minimum number of axially flexible portions effective to prevent a rupture of such portions.

In accordance with this invention, one or more of the above stated objects may be readily accomplished in a fluid conducting system embodying an expansion joint interconnecting adjacent, exhaust fluid conducting parts for relative longitudinal expansion and contraction by connecting said conductor parts with a compensating means which is in turn connected with a part of the system subjecting the compensator to the action of a fluid whose temperature and pressure are low and high, respectively, relative to the temperature and pressure of the exhaust fluid and whose pressure increases and decreases as the pressure of the exhaust fluid increases and decreases, respectively. On the other hand, the compensating means may be connected to a part of the system regardless of the temperature of the fluid but the pressure of which is high relative to the pressure of the exhaust fluid. In addition to the foregoing, apparatus embodying the invention may also include as features thereof novel correlations of elements which are of considerable commercial importance in that they render the apparatus durable, cheap to manufacture and readily applicable to both new and existing installations.

Accordingly, the invention also consists of the various details of construction, combinations of elements and arrangements of parts as is more fully set forth in the appended claims and in the detailed description, reference being had to the accompanying drawing showing several embodiments of the invention and in which:

Fig. 1 schematically illustrates a continuous combustion gas turbine system embodying the invention;

Fig. 2 is a plan view of the expansion joint construction shown in Fig. 1;

Fig. 3 is a partial section through the joint taken on line III—III of Fig. 1; and Fig. 4 is a view similar to Fig. 1 showing another embodiment of the invention.

As shown in Fig. 1 of the drawing, the invention may be applied to an elastic fluid power system comprising an axial compressor 1, a combustion chamber 2 embodying a fluid fuel burner 3 having a control valve 4 and a connection 6 with a suitable source of fuel (not shown), an axial flow turbine 7 drivingly connected with the compressor 1, and fluid conducting means including a conduit 8 connecting the discharge of compressor 1 with the burner end of combustion chamber 2, a conduit 9 connecting the opposite end of combustion chamber 2 with the inlet of turbine 7, and a conduit 11 connecting the exhaust of turbine 7 with additional appropriate apparatus such as a low pressure turbine or heat exchanger (not shown), it being understood that the flanged end 12 of conduit 11 will be fixedly connected to such additional apparatus in any suitable manner. However, such additional apparatus and the manner in which same may be fixedly connected to the conduit 11 forms no part of this invention, and a further description in this connection is, therefore, deemed unnecessary.

Conduit 11 includes an expansion joint unit 13 connecting the adjacent parts 14 and 16 of conduit 11 for relative longitudinal expansion and contraction, it being understood, of course, that the remote ends of the parts 14 and 16 are fixed to the structures with which they are connected; said unit comprising (see Figs. 2 and 3) conductors 17a, 18a of short axial length having substantially rigid end portions 17 and 18 firmly secured to the opposed ends of adjacent parts 14 and 16, respectively, and a flexible intermediate portion 19 rendering said end portions movable longitudinally relative to each other, a plurality of cylinders 21 (only one of which is shown in Fig. 3) carried by the portion 17 for movement therewith, and a piston 22 reciprocable in each of said cylinders and having a projection 23 connected to and rendering said piston movable with the portion 18.

The connection between each cylinder 21 and end portion 17 comprises a fixed bracket 24 which may be welded or otherwise integrally secured to portion 17, a longitudinally extending stem 26 on cylinder 21 having its outer end provided with a socket portion 27 and a ball 28 disposed within said socket and having a stem portion 29 detachably connected to the bracket 24. End portion 18 is also provided with brackets 31 which are connected to the projection 23 on piston 22 in exactly the same manner that bracket 24 is connected to the stem 29 on cylinder 21.

Flexible portion 19 comprises two axially spaced cylindrical sections 32 and 33 which are connected to each other and to the conductors 17a and 18a and hence to the end portions 17 and 18 by pairs of axially flexible annular disks 34 and 36 with each pair of disks having their inner peripheries sealingly secured to the spaced opposed ends of the sections and/or end portions to be connected together and having their outer peripheries sealingly connected to the axially spaced inner edges of a surrounding tubular element 37, as shown. This construction, which is not in itself new, is merely illustrative of one form of flexible portion which may be employed in carrying out the invention, and it should, therefore, be understood that neither the number nor the form of such sections is essential since any means effective to sealingly connect the end portions 17 and 18 for relative longitudinal movement will suffice.

Each cylinder 21 is provided with a fluid admission connection 38 disposed between the piston 22 therein and the end of the cylinder adjacent the bracket 31 on end portion 18. A pipe 39 provided with branches 41 and 42 connects conduit 8, i. e., the discharge of compressor 1, with the fluid admission connection 38 in each cylinder. Consequently, it should be obvious that the admission of fluid under pressure through the connection 38 urges the cylinder and piston in opposite directions and the parts 14 and 16 of conduit 11 toward each other with forces determined by the pressure of the fluid and the effective areas of the opposed piston and cylinder portions.

The pressure of the fluid flowing through conduit 11, assuming no appreciable drop in pressure occurs in passing from the turbine 7 to the flanged end 12 thereof and disregarding the kinetic energy of the fluid, exerts an axial thrust on the parts 14 and 16 tending to pull apart and rupture the flexible portion of the expansion joint; the thrust in each such case being directly proportional to the cross sectional area of the part and the pressure of the fluid flowing therethrough. For example, if the conduit 11 is arranged as shown in Fig. 1 and the pressure of the fluid entering and leaving the parts 14 and 16 thereof is ten pounds per square inch and the cross sectional area of each part is the same and equals 50 square inches, there is an equal and oppositely acting axial thrust of 500 pounds set up in each part; the thrust in part 14 acting towards the left and the thrust in part 16 acting towards the right, thereby subjecting the flexible portion of joint 13 to a rupturing force of 500 pounds in addition to that produced by the pressure of the fluid acting on the walls 34 and 36 connected with the end portions 17 and 18, respectively. An expansion joint in order to be effective as such should afford but little resistance to relative longitudinal movements of the adjacent ends of conduit sections connected thereby, and it should, therefore, be obvious that if such joints are constructed to resist the fluid produced axial thrusts, the joints are in most instances altogether too stiff to render them effective for the purpose intended. However, when combined with an additional connecting means such as hereinabove described, the admission of fluid under pressure to cylinder 21 produces oppositely acting compensating forces on the parts 14 and 16, thereby minimizing or canceling the effect of the fluid pressure produced axially acting thrusts with a minimum number of parts of small size.

In this connection, it should be noted that in an elastic fluid power system of the type disclosed, variations in power output are effected by varying the heat input to the motive fluid which is accomplished by varying the quantity of fuel supplied to the combustion chamber and thereby the temperature of the motive fluid and that each increase and decrease in motive fluid temperature is accompanied by a corresponding change in turbine speed which in turn produces a corresponding change in the pressure of combustion supporting air delivered by the compressor. Consequently, it should now be obvious that since cylinder 21 is connected with the discharge of compressor 1, the pressure of the fluid admitted to said cylinder varies in accordance with the pressure of the motive fluid flowing through the parts 14 and 16 and that since the pressure of air discharged from the compressor 1 is always considerably higher than the pressure of the motive fluid exhausting from the turbine 7, the axial thrust imparted to the parts 14 and 16 by the pressure of the fluid flowing therethrough can be readily compensated for with a compact and durable cylinder and piston construction of practical dimensions.

Reference is now made to Fig. 4 which shows embodiment of the invention. The system fragmentarily shown in Fig. 4 does not differ from the system of Fig. 1 except as now to be pointed out. In the embodiment of Fig. 4 the openings 38 of the cylinders 21 are connected by pipes 41 and 39a to the conduit 9, instead of to the conduit 8 of Fig. 1 (not shown in Fig. 4). It will be evident that the fluid pressure in conduit 9 is always high compared to the fluid pressure of the expanded exhaust gases in conduit 11. Hence the desired compensation of the expansion joint 13 is secured. The connecting pipe means between the cylinders 21 and the conduit 9 may, if desired, be provided with heat dissipating means such as the fins 50 here shown on the pipe 39a. It may be noted, however, that once the cylinders 21 are filled with gas, no further flow takes place from the conduit 9 to the cylinders 21 so that heat dissipated from the pipe means 41, 39a, if the pipe means is of sufficient length, may render special heat dissipating means, such as the fins 50, unnecessary if it is desired to run the cylinders 21 at a temperature relatively low compared with the fluid in conduit 9.

The invention is applicable to all forms of fluid systems embodying an expansion joint interconnecting the adjacent ends of fluid conducting sections or parts for relative longitudinal expansion and contraction, and it should, therefore, be understood that although the invention has been illustrated and disclosed in connection with a continuous combustion gas turbine system, it is not intended to limit the invention to the exact constructions herein shown and described, as various modifications within the scope of the appended claims may occur to persons skilled in the art.

It is claimed and desired to secure by Letters Patent:

1. In combination in an elastic fluid system including compressor means for providing compressed elastic fluid, combustion chamber means, means for conducting compressed elastic fluid from the discharge means of said compressor means to said combustion chamber means, turbine means operable by combustion gases, means for conducting combustion gases from said combustion chamber means to inlet means for said turbine means, exhaust conductor means receiving exhaust gases from said turbine means and including opposed conductor portions connected by an axially flexible expansion joint for relative longitudinal movement, a cylinder carried by one of said conductor portions in spaced parallel relation with respect to said flexible expansion joint, a piston carried by the other one of said conductor portions and reciprocably disposed within said cylinder, said cylinder having an opening for admitting fluid under pressure to act on said cylinder and piston and thereby urge said conductor portions axially toward each other, and means placing said opening in communication with said system at a place between the discharge means of said compressor means and inlet means to said turbine means.

2. In combination in an elastic fluid system including compressor means for providing compressed elastic fluid, combustion chamber means, means for conducting compressed elastic fluid from the discharge means of said compressor means to said combustion chamber means, turbine means operable by combustion gases, means for conducting combustion gases from said combustion chamber means to inlet means for said turbine means, exhaust conductor means receiving exhaust gases from said turbine means and including opposed conductor portions connected by an axially flexible expansion joint for relative longitudinal movement, a cylinder carried by one of said conductor portions in spaced parallel relation with respect to said flexible expansion joint, a piston carried by the other one of said conductor portions and reciprocably disposed within said cylinder, said cylinder having an opening for admitting fluid under pressure to act on said cylinder and piston and thereby urge said conductor portions axially toward each other, and means placing said opening in communication with said system at a place between the discharge means of said compressor means and inlet means of said combustion chamber means.

3. In combination in an elastic fluid system including compressor means for providing compressed elastic fluid, combustion chamber means, means for conducting compressed elastic fluid from the discharge means of said compressor means to said combustion chamber means, turbine means operable by combustion gases, means for conducting combustion gases from said combustion chamber means to inlet means for said turbine means, exhaust conductor means receiving exhaust gases from said turbine means and including opposed conductor portions connected by an axially flexible expansion joint for relative longitudinal movement, a cylinder carried by one of said conductor portions in spaced parallel relation with respect to said flexible expansion joint, a piston carried by the other one of said conductor portions and reciprocably disposed within said cylinder, said cylinder having an opening for admitting fluid under pressure to act on said cylinder and piston and thereby urge said conductor portions axially toward each other, and means placing said opening in communication with said system at a place between said combustion chamber means and inlet means to said turbine means.

4. In combination in an elastic fluid system including compressor means for providing low temperature compressed elastic fluid, combustion chamber means, means for conducting compressed elastic fluid from the discharge means of said compressor means to said combustion chamber means, turbine means operable by combustion gases, means for conducting combustion gases from said combustion chamber means to inlet means for said turbine means, exhaust conductor means receiving exhaust gases from said turbine means and including opposed conductor portions connected by an axially flexible expansion joint for relative longitudinal movement, a cylinder carried by one of said conductor portions in spaced parallel relation with respect to said flexible expansion joint, a piston carried by the other one of said conductor portions and reciprocably disposed within said cylinder, said cylinder having an opening for admitting fluid under pressure to act on said cylinder and piston and thereby urge said conductor portions axially toward each other, pipe means placing said opening in communication with said system at a place between the discharge means of said compressor means and inlet means to said turbine means, and means for dissipating heat from said pipe means.

5. In an elastic fluid turbine system, a compressor, a combustion chamber, a turbine drivingly connected with said compressor, fluid conducting means including portions connecting said compressor, combustion chamber and turbine in series flow relation for supplying air to said combustion chamber and combustion products to said turbine, said fluid conducting means including a turbine exhaust portion having an axially flexible expansion joint interconnecting adjacent opposed parts of said exhaust portion for relative longitudinal movement, means for varying the heat input to said combustion chamber and thereby the temperature and pressure of the combustion products exhausting from said turbine, a cylinder carried by one of said adjacent opposed parts, a piston reciprocable within said cylinder and carried by the other one of said adjacent opposed parts, said cylinder having an opening for admitting fluid under pressure to act on said cylinder and piston and thereby urge said adjacent opposed parts toward each other, and means placing said opening in communication with a portion of said system confining and conducting compressed unheated elastic fluid to said combustion chamber whereby the interior of said cylinder is normally subjected to the action of a fluid whose temperature and pressure are low and high, respectively, relative to the temperature and pressure of the hot combustion products exhausting from said turbine and whose pressure increases and decreases as the pressure and temperature of the hot combustion products exhausting from said turbine increases and decreases, respectively.

6. In combination in an elastic fluid system embodying a source of compressed, low temperature elastic fluid, a variable temperature fuel burning apparatus receiving compressed elastic fluid from said source and producing highly heated combustion gases having a temperature proportional to fuel input, a turbine receiving and expanding said highly heated combustion gases, and a conductor confining the hot combustion gases exhausting from said turbine and including opposed portions connected by an axially flexible expansion joint for relative longitudinal movement, a cylinder carried by one of said conductor portions, a piston carried by the other one of said conductor portions and reciprocably disposed within said cylinder, said cylinder having an opening for admitting fluid under pressure to act on said cylinder and piston and thereby urge said conductor portions toward each other, and means for placing said opening in communication with a part of said system confining and conducting compressed unheated elastic fluid to said fuel burning apparatus whereby the interior of said cylinder is normally subjected to a fluid whose temperature and pressure are low and high, respectively, relative to the temperature and pressure of the hot exhaust gases and whose pressure increases and decreases as the pressure and temperature of the hot exhaust gases increases and decreases, respectively.

7. In combination in an elastic fluid system including compressor means for providing compressed elastic fluid, combustion chamber means, means for conducting compressed elastic fluid from the discharge means of said compressor means to said combustion chamber means, turbine means operable by combustion gases, means for conducting combustion gases from said combustion chamber means to inlet means for said turbine means, exhaust conductor means receiving exhaust gases from said turbine means and including opposed conductor portions connected by an axially flexible expansion joint for relative longitudinal movement, expansible and contractible cell means having relatively movable walls one of which is connected to one of said conductor portions and the other of which is connected to the other one of said conductor portions, said cell means having an opening for admitting fluid under pressure to act on said relatively movable walls and thereby urge said conductor portions axially toward each other, and means placing said opening in communication with said system at a place between the discharge means of said compressor means and inlet means to said turbine means.

8. In combination in an elastic fluid system including compressor means for providing compressed elastic fluid, combustion chamber means, means for conducting compressed elastic fluid from the discharge means of said compressor means to said combustion chamber means, turbine means operable by combustion gases, means for conducting combustion gases from said combustion chamber means to inlet means for said turbine means, exhaust conductor means receiving exhaust gases from said turbine means and including opposed conductor portions connected by an axially flexible expansion joint for relative longitudinal movement, expansible and contractible cell means having relatively movable walls one of which is connnected to one of said conductor portions and the other of which is connected to the other one of said conductor portions, said cell means having an opening for admitting fluid under pressure to act on said relatively movable walls and thereby urge said conductor portions axially toward etch other, and means placing said opening in communication with said system at a place between the discharge means of said compressor means and inlet means to said combustion chamber.

9. In an elastic fluid turbine system, a compressor, a combustion chamber, a turbine drivingly connected with said compressor, fluid conducting means including portions connecting said compressor, combustion chamber and turbine in series flow relation for supplying air to said combustion chamber and combustion products to said turbine, said fluid conducting means including a turbine exhaust portion having an axially flexible expansion joint interconnecting adjacent opposed parts of said exhaust portion for relative longitudinal movement, means for varying the heat input to said combustion chamber and thereby the temperature and pressure of the combustion products exhausting from said turbine, expansible and contractible cell means having relatively movable walls one of which is connected to one of said adjacent opposed parts and the other of which is connected to the other one of said adjacent opposed parts, said cell means having an opening for admitting fluid under pressure to act on said relatively movable walls and thereby urge said adjacent opposed parts toward each other, and means placing said opening in communication with a portion of said system confining and conducting compressed unheated elastic fluid to said combustion chamber whereby the interior of said cell means is normally subjected to the action of a fluid whose temperature and pressure are low and high, respectively, relative to the temperature and pressure of the hot combustion products exhausting from said turbine.

10. In combination in an elastic fluid system embodying a source of compressed, low temperature elastic fluid, a variable temperature fuel burning apparatus receiving compressed elastic fluid from said source and producing highly heated combustion gases having a temperature proportional to fuel input, a turbine receiving and expanding said highly heated combustion gases, and a conductor confining the hot combustion gases exhausting from said turbine and including opposed portions connected by an axially flexible expansion joint for relative longitudinal movement, expansible and contractible cell means having relatively movable walls one of which is connected to one of said conductor portions and the other of which is connected to the other of said conductor portions, said cell means having an opening for admitting fluid under pressure to act on said relatively movable walls and thereby urge said conductor portions toward each other, and means for placing said opening in communication with a part of said system confining and conducting compressed unheated elastic fluid to said fuel burning apparatus whereby the interior of said cylinder is normally subjected to a fluid whose temperature and pressure are low and high, respectively, relative to the temperature and pressure of the hot exhaust gases.

HANS A. ALTORFER.

REFERENCES CITED

The following references are of record in the file of this patent:

UNITED STATES PATENTS

| Number | Name | Date |
|---|---|---|
| 1,888,026 | Chapman | Nov. 15, 1932 |
| 2,314,776 | Dittus | Mar. 23, 1943 |
| 2,355,440 | Howard | Aug. 8, 1944 |

FOREIGN PATENTS

| Number | Country | Date |
|---|---|---|
| 725,839 | France | Nov. 6, 1931 |
| 534,704 | Germany | Oct. 1, 1931 |